US012752765B1

(12) United States Patent
Lee et al.

(10) Patent No.: US 12,752,765 B1
(45) Date of Patent: Oct. 6, 2026

(54) SMART VEHICLE SYSTEMS AND CONTROL LOGIC FOR ACTIVE BRAKE DRAG MITIGATION OF ELECTROMECHANICAL BRAKE SYSTEMS

(71) Applicant: GM GLOBAL TECHNOLOGY OPERATIONS LLC, Detroit, MI (US)

(72) Inventors: Jeehyung Lee, Seoul (KR); Seokju Yong, Bucheon-si (KR); Dongseok Yoon, Seoul (KR); Sanghyun Song, Seoul (KR)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/172,720

(22) Filed: Apr. 8, 2025

(51) Int. Cl.
*B60T 17/22* (2006.01)
*B60W 30/18* (2012.01)

(52) U.S. Cl.
CPC ..... *B60T 17/221* (2013.01); *B60W 30/18109* (2013.01); *B60W 2520/06* (2013.01); *B60W 2520/125* (2013.01); *B60W 2540/10* (2013.01); *B60W 2540/18* (2013.01)

(58) Field of Classification Search
CPC ........... B60T 17/221; B60W 30/18109; B60W 2520/06; B60W 2520/125; B60W 2540/10; B60W 2540/18
USPC ........................................................... 701/70
See application file for complete search history.

(56) References Cited

U.S. PATENT DOCUMENTS 7,589,643 B2 9/2009 Dagci et al.
8,135,526 B2 3/2012 Minarcin et al.
8,190,344 B2 * 5/2012 Krueger .......... B60W 30/18145 180/65.285
8,265,846 B2 9/2012 Kinser et al.
8,303,049 B2 11/2012 Busack et al.
8,326,509 B2 12/2012 Logan et al.
8,327,981 B2 12/2012 Giering et al.
8,494,732 B2 7/2013 Heap
8,886,432 B2 11/2014 Fahland et al.
8,996,273 B2 3/2015 Lee et al.
(Continued)

FOREIGN PATENT DOCUMENTS

DE 19813912 A1 9/1999
DE 19909948 9/2000
(Continued)

*Primary Examiner* — Hai H Huynh
(74) *Attorney, Agent, or Firm* — Quinn IP Law

(57) ABSTRACT

Presented are smart vehicle systems provisioning active brake drag control, methods for making/using such systems, and vehicles equipped with such systems. A method of operating a motor vehicle with a brake-by-wire (BBW) system includes a vehicle controller determining whether or not the vehicle is traveling in a forward direction. If so, the controller responsively retrieves advanced driver assistance system (ADAS) data and driving torque request data to determine if an ADAS warning event is detected or an acceleration torque request was received to accelerate the motor vehicle. The controller commands an electric motor of the BBW brake system to drive a brake actuator and thereby change a running clearance (RC) between a brake pad and a brake rotor to a reduced RC responsive to detecting the ADAS warning event or to an increased RC responsive to receiving the acceleration request to accelerate the motor vehicle.

20 Claims, 3 Drawing Sheets

(56) References Cited

U.S. PATENT DOCUMENTS

| | | | |
|---|---|---|---|
| 9,931,963 B2 | 4/2018 | Heisel et al. | |
| 10,227,021 B2 | 3/2019 | Lor et al. | |
| 10,259,341 B2 | 4/2019 | Lor et al. | |
| 11,685,262 B2 | 6/2023 | Otanez et al. | |
| 11,752,881 B2 | 9/2023 | Otanez et al. | |
| 12,434,685 B2 * | 10/2025 | Yamasaki | B60W 10/111 |
| 2012/0101713 A1 | 4/2012 | Moshchuk | |
| 2013/0219294 A1 | 8/2013 | Goldman-Shenhar et al. | |
| 2014/0116816 A1 | 5/2014 | Begleiter et al. | |
| 2015/0266383 A1 | 9/2015 | Kidston et al. | |
| 2017/0136916 A1 | 5/2017 | Heisel et al. | |
| 2021/0171038 A1 * | 6/2021 | Lee | B60W 30/18109 |
| 2023/0132470 A1 * | 5/2023 | Tsuji | B62D 15/025<br>701/26 |

FOREIGN PATENT DOCUMENTS

| | | |
|---|---|---|
| DE | 10322879 A1 | 11/2004 |
| DE | 102009023782 A1 | 12/2010 |

* cited by examiner

SMART VEHICLE SYSTEMS AND CONTROL LOGIC FOR ACTIVE BRAKE DRAG MITIGATION OF ELECTROMECHANICAL BRAKE SYSTEMS

INTRODUCTION

The present disclosure relates generally to brake systems for motor vehicles. More specifically, aspects of this disclosure relate to closed-loop feedback control systems and methods for mitigating brake drag of brake-by-wire (BBW) vehicle brake systems.

Current production motor vehicles, such as the modem-day automobile, are originally equipped with a vehicle brake system that operates to selectively slow and ultimately stop the vehicle. Automobiles have traditionally employed a hydraulic or pneumatic brake system that is activated by the vehicle driver or, for advanced driver assistance system (ADAS) and autonomous vehicle (AV) applications, by an on-board vehicle controller. The most common type of brake system used by modem-day passenger vehicles is a friction brake system in which a hydraulically actuated piston drives a brake pad or shoe ("friction brake element") into frictional engagement with a rotating drum or rotor ("rotating brake element"). For disk-type brake systems, the piston is reciprocally nested inside a brake caliper that mounts onto the steering knuckle, and the brake rotor is bolted onto the spindle to rotate with the wheel unit. In so doing, the friction brake system converts kinetic energy of the vehicle into heat energy of the frictionally engaged rotating and frictional brake elements in order to slow/stop rotation of a corresponding wheel unit.

Some automobiles now employ a decentralized "brake-by-wire" system that replaces traditional hydraulic and pneumatic brake hardware with either electromechanical or electrohydraulic vehicle brake components. Electromechanical brake (EMB) systems—a subset of BBW—use a central brake system control module (BSCM) that activates individual motor-driven actuators that are located at each wheel corner module to provide a desired braking force at that wheel unit. A ball screw type EMB system, for example, utilizes a BSCM-controlled motor to reciprocally drive a worm shaft of a ball-screw actuator into and away from a brake piston. In so doing, the brake piston engages and disengages a friction brake pad with one of the EMB's brake rotors. During normal operation, a friction brake system may experience what is known as "brake drag" in which the brake pads or shoes fail to fully disengage from the rotor or drum when the brake pedal is released, causing unwanted friction and heat between the brake components.

SUMMARY

Presented herein are smart vehicle systems with attendant control logic for provisioning active brake drag control, methods for manufacturing and methods for operating such systems, and motor vehicles equipped with such systems. By way of example, and not limitation, a closed-loop feedback control system actively modulates the running clearances between an EMB's brake pads and their respective brake rotors to minimize or, when possible, outright eliminate brake drag. A larger running clearance may be implemented under select vehicle operating conditions to lower brake drag, such as when slower brake system response times are acceptable. To improve vehicle fuel efficiency and brake pad life, for example, brake drag may be minimized by increasing running clearance in driving scenarios in which there is no brake request from the driver or the advanced driver assistance system (ADAS). Conversely, a smaller running clearance may be implemented under other select vehicle operating conditions to reduce required piston travel, such as when faster brake system response times are deemed necessary. Upon detection of a forward impact condition, for example, running clearance may be automatically reduced in anticipation of a hard braking event. Running clearance settings may be individually calibrated to a subject "host" vehicle (e.g., make, year, model, trim, etc.) and/or to a subject brake system architecture (e.g., BBW, EMB, brake caliper, brake pad, etc.). To help maximize brake system efficiency and performance, the control system may dynamically adapt an optimal running clearance in response to various driving scenarios based on the EMB system's available piston retraction control.

Aspects of this disclosure are directed to BBW vehicle brake systems, brake system control logic, and closed-loop feedback control techniques for active brake drag control. In an example, a method is presented for operating a motor vehicle with a BBW brake system. This representative method includes, in any order and in any combination with any of the above and below disclosed options and features: receiving, e.g., via a resident or remote microprocessor, central controller, control module, programmable logic device, integrated circuit (IC) device, or network of processors/controllers/modules/devices (collectively "vehicle controller") from a powertrain control module (PCM) and/or wheel speed sensor, vehicle dynamics data indicating the motor vehicle is keyed on and traveling in a forward direction; receiving, e.g., via the vehicle controller responsive to confirming the vehicle traveling forward, ADAS data (e.g., from an ADAS control module) and driving torque request (DTR) data (e.g., from a throttle-by-wire (TBW) accelerator pedal); determining, e.g., via the vehicle controller from the received ADAS and DTR data, whether or not an ADAS warning event is detected (e.g., forward impact, lane departure, cross traffic, etc.) and/or an acceleration torque request was received, e.g., from the driver or the host vehicle, to accelerate the motor vehicle; and commanding, e.g., via the vehicle controller, one or more electric brake motors of the BBW brake system to drive respective brake actuators and thereby change a running clearance (RC) between respective friction brake elements and rotating brake elements to either: (1) a reduced RC distance in response to detecting the ADAS warning event; or (2) an increased RC distance in response to receiving the acceleration request, which indicates a brake request was not received.

Aspects of this disclosure are also directed to computer-readable media (CRM) containing controller-executable instructions for provisioning dynamic adaptation of friction brake running clearance for active brake drag control. In an example, a non-transient CRM stores instructions that are executable by a vehicle controller of a motor vehicle with a BBW brake system, which includes a brake motor that drives a brake actuator to thereby press a friction brake element against a rotating brake element to slow/stop the vehicle. These CRM-stored instructions, when executed, cause the system controller to perform operations that include: receiving vehicle dynamics data indicating the motor vehicle is traveling in a forward direction; receiving, responsive to the motor vehicle traveling in the forward direction, advanced driver assistance system (ADAS) data and driving torque request (DTR) data; determining if the ADAS data indicates an ADAS warning event is detected and if the DTR data indicates an acceleration torque request was received to accelerate the motor vehicle; and commanding the brake motor to drive the brake actuator and thereby change a running clearance between the friction brake element and the rotating brake element to a reduced RC distance in response to detection of the ADAS warning event or to an increased RC distance in response to receiving the acceleration torque request to accelerate the motor vehicle.

Additional aspects of this disclosure are directed to motor vehicles equipped with BBW-EMB brake systems and closed-loop feedback control for mitigating brake drag. As used herein, the terms "vehicle" and "motor vehicle" may be used interchangeably and synonymously to reference any relevant vehicle platform, such as passenger vehicles, commercial vehicles, industrial vehicles, tracked vehicles, off-road and all-terrain vehicles, farm equipment, motorcycles, aircraft, spacecraft, etc. In an example, a motor vehicle includes a vehicle body with a passenger cabin, multiple road wheels attached to the vehicle body (e.g., via wheel corner modules coupled to a unibody or body-on-frame chassis), and other standard original equipment. A prime mover, which may be in the nature of an electric traction motor and/or an internal combustion engine (ICE) assembly, is located inside the vehicle body and drives the road wheel(s) to propel the vehicle. The vehicle is also equipped with a BBW brake system that includes multiple EMB units, each of which is operable to slow a respective one of the vehicle's road wheels. Each EMB unit contains an electric servo motor that drives a ball-screw actuator (BSA) assembly and thereby pushes a brake piston into a brake pad such that the brake pad presses against a brake rotor mounted to rotate in unison with its respective road wheel.

Continuing with the discussion of the foregoing example, the vehicle is also equipped with a resident or remote vehicle controller that is programmed to receive vehicle dynamics data and determine therefrom whether or not the motor vehicle is traveling in a forward direction. If so, the vehicle controller responsively receives ADAS data from an on-body vehicle sensor array and DTR data from a driver input device, and uses this data to determine if an ADAS warning event is detected and if an acceleration torque request was received to accelerate the motor vehicle. The vehicle controller concomitantly commands the electric servo motors of the BBW brake system to drive their respective BSA assemblies and thereby change the running clearances between their respective brake pads and brake rotors to a reduced or increased RC distance, e.g., in response to detection of the ADAS warning event, or to an increased RC distance, e.g., in response to receiving the acceleration torque request to accelerate the motor vehicle.

For any of the disclosed methods, CRM, and vehicles, the vehicle controller may also evaluate the ADAS and DTR data to determine if an ADAS warning event was not detected and the acceleration torque request was received. Responsive to not detecting an ADAS warning event and receiving the acceleration torque request, the vehicle controller may receive vehicle lateral acceleration (VLA) data from a multi-axis accelerometer of the motor vehicle. In this instance, the vehicle controller may evaluate the VLA sensor data to determine if a current lateral acceleration of the motor vehicle exceeds a predefined VLA threshold (e.g., ~0.2 g-force (g)); if it does, the vehicle controller may responsively command each BBW brake motor to drive its brake actuator and thereby change the running clearance to a level-2 (second) increased RC distance, which is greater than the level-1 (first) increased RC distance.

For any of the disclosed methods, CRM, and vehicles, the vehicle controller may evaluate the VLA and DTR data to determine if the host vehicle's current lateral acceleration is less than the predefined VLA threshold and the host vehicle's current speed is less than a predefined speed threshold; if so, the vehicle controller may responsively command each brake motor to drive its brake actuator and thereby change the running clearance to a level-3 (third) increased RC distance, which is greater than both the level-1 (first) and level-2 (second) RC distances. As a further option, the vehicle controller may also receive steering wheel angle (SWA) sensor data from an angle sensor of a steer-by-wire (SBW) steering wheel of the motor vehicle, and evaluate this SWA data to determine if a current SWA of the motor vehicle's steering wheel is less than a predefined SWA threshold (e.g., ~235°). In this instance, commanding the brake motor(s) to change the running clearance to the level-3 (third) increased RC distance is further in response to the current SWA of the steering wheel being less than the predefined SWA threshold.

For any of the disclosed methods, CRM, and vehicles, the vehicle controller may, prior to changing the running clearance, receive vehicle ignition data (e.g., from a body control module (BCM)) indicating the motor vehicle was turned on. In response to detecting the motor vehicle being turned on, the vehicle controller may command the brake motors to drive their respective brake actuators to thereby set the running clearance to a default RC distance. As a further option, the vehicle controller may determine, after changing the RC to an increased RC distance, if the host vehicle is still traveling in a forward direction; if so, the vehicle controller may responsively determine if another (new) acceleration torque request was received. In response to not receiving a new acceleration request, the controller may command the brake motor to set the running clearance to a default RC distance. The acceleration request may be received from the vehicle driver via a driver input device (e.g., accelerator pedal, cruise control button panel, etc.), and/or from an ADAS system control module (e.g., Adaptive Cruise Control (ACC) control module).

For any of the disclosed methods, CRM, and vehicles, the vehicle controller may evaluate the received ADAS and DTR data to confirm that a brake request was not received from the vehicle driver or the vehicle's ADAS system. In this instance, the vehicle controller may actively adapt the vehicle brake system's running clearance in response to confirming a brake request was not received from either the driver or the ADAS system. After detecting an ADAS warning event, the vehicle controller may evaluate new ADAS data to determine whether or not the ADAS warning event is no longer detected; upon confirming that the ADAS warning event is no longer detected, the vehicle controller may responsively command the BBW system's brake motors to drive their respective brake actuator and thereby set the running clearance to a default RC distance.

For any of the disclosed methods, CRM, and vehicles, vehicle lateral acceleration may be monitored via a resident inertial measurement unit (IMU) that contains a six-axis accelerometer and integrated gyroscope. Rather than using accelerometer feedback, vehicle turning analysis for dynamic adaptation of RC may be derived as a function of steering wheel angle and real-time vehicle speed. Moreover, ADAS system data for detecting an ADAS warning event may be derived from an on-vehicle sensor array, which may include a forward vehicle camera, a forward long-range radar sensor, a forward mid-range lidar sensor, ultrasonic sensors, side-mirror mounted lateral cameras, etc. In addition to the PCM and wheel speed sensor(s), vehicle dynamics data may be received from an engine control module (ECM), a motor control module (MCM), a body control module (BCM), a PRNDL shift knob or dial, and/or an IMU.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
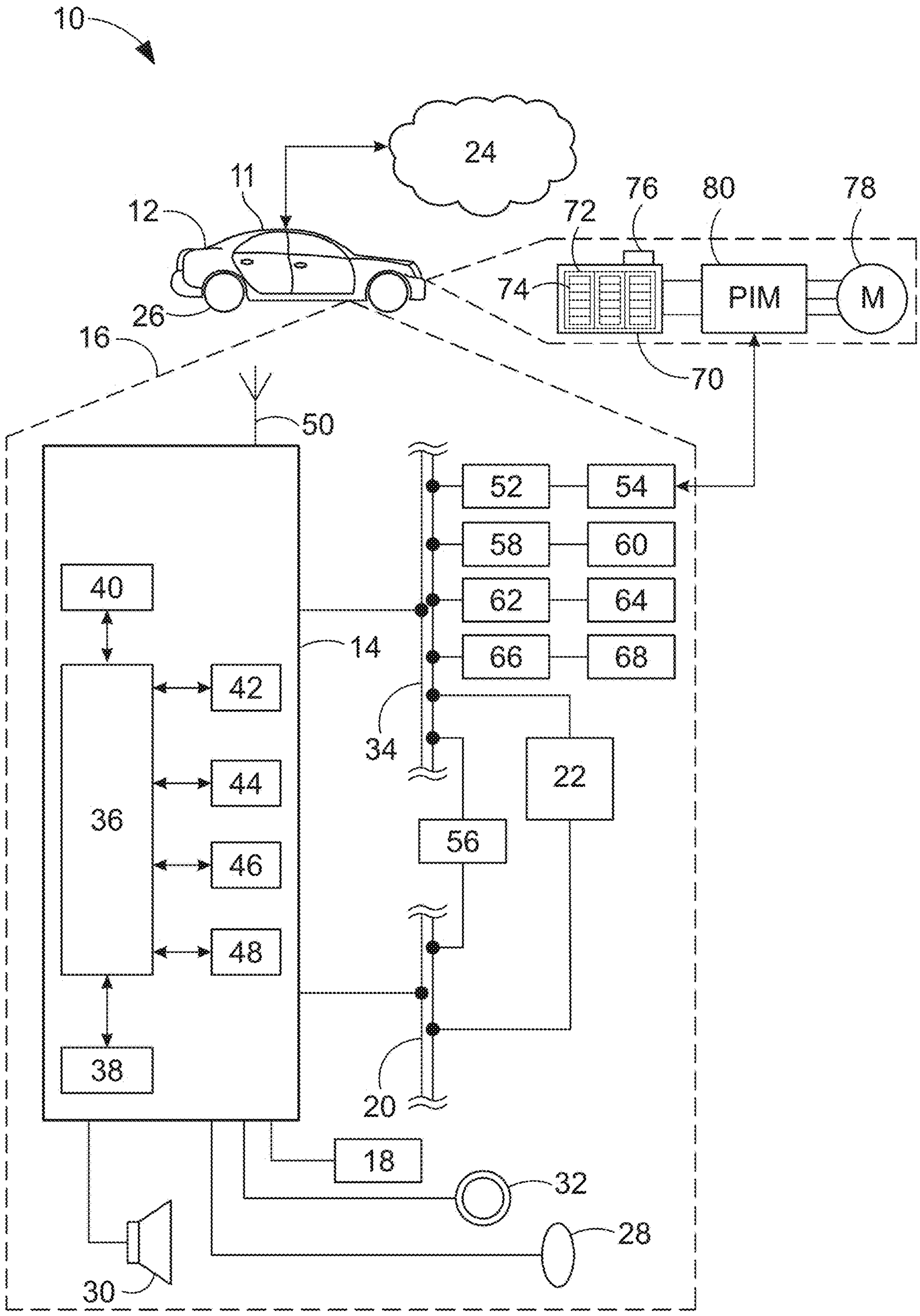
FIG. 1 is a partially schematic, side-view illustration of a representative motor vehicle with a drive-by-wire friction brake system and a network of in-vehicle controllers, sensors, and communication devices for provisioning active brake drag control in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, node, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, incorporation of the present concepts into the specific EBM brake system architecture presented in the drawings should also be appreciated as a non-limiting implementation of disclosed features. As such, it will be understood that novel aspects of this disclosure may be implemented for other BBW brake system architectures and may be incorporated into any logically relevant type of motor vehicle. Moreover, only select components of the motor vehicle and the vehicle brake system are shown and described in detail herein. Nevertheless, the vehicles and brake systems discussed below may include numerous additional and alternative features, and other available peripheral hardware, for carrying out the various methods and functions of this disclosure.

The representative vehicle 10 of FIG. 1 is originally equipped with a vehicle telecommunications and informatics ("telematics") unit 14 that wirelessly communicates, e.g., via cellular network, satellite service, wireless-enabled modem, etc., with a remotely located cloud computing host service 24 (e.g., ONSTAR®). Some of the other vehicle hardware components 16 shown generally in FIG. 1 include, as non-limiting examples, an electronic video display device 18, a microphone 28, audio speaker(s) 30, and assorted user input controls 32 (e.g., pedals, buttons, knobs, switches, touchpads, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal commands; the vehicle 10 may be equipped with an embedded voice-processing unit with audio filtering, editing, and analysis modules. Conversely, the speaker 30 provides audible output to a vehicle occupant and may be either a stand-alone speaker dedicated to the telematics unit 14 or may be part of an in-cabin audio system 22. The audio system 22 is connected to a network connection interface 34 and an audio bus 20 to receive analog and digital information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, and other automated functions. For instance, telematics unit 14 may exchange signals with a Powertrain Control Module (PCM) 52, an Advanced Driver Assistance System (ADAS) module 54, a Brake System Control Module (BSCM) 56, a Body Control Module (BCM) 58, a Sensor System Interface Module (SSIM) 60, and assorted other vehicle ECUs, such as an Engine Control Module (ECM), a Motor Control Module (MCM), a Transmission Control Module (TCM), a Sensing and Diagnostics Module (SDM), a Steering Control Module (SCM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, solid-state drive (SSD) memory, hard-disk drive (HDD) memory, phase-change memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), a wireless modem, or a mobile hotspot, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual RF antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Cloud (V2C), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automated vehicle operation.

To propel the automobile 10, a vehicle powertrain is operable to generate and deliver tractive torque to one or more of the vehicle's drive wheels 26. The powertrain is represented in FIG. 1 by an electric traction motor (M) 78 that is operatively connected to a rechargeable energy storage system (RESS), which may be in the nature of a chassis-mounted traction battery pack 70. The traction battery pack 70 is generally composed of one or more battery modules 72 each containing a cluster of battery cells 74, such as lithium-class, zinc-class, nickel-class, or organosilicon-class cells of the pouch, prismatic, or cylindrical type. One or more prime movers, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables on-module management, cell sensing, etc.

Figure 2:
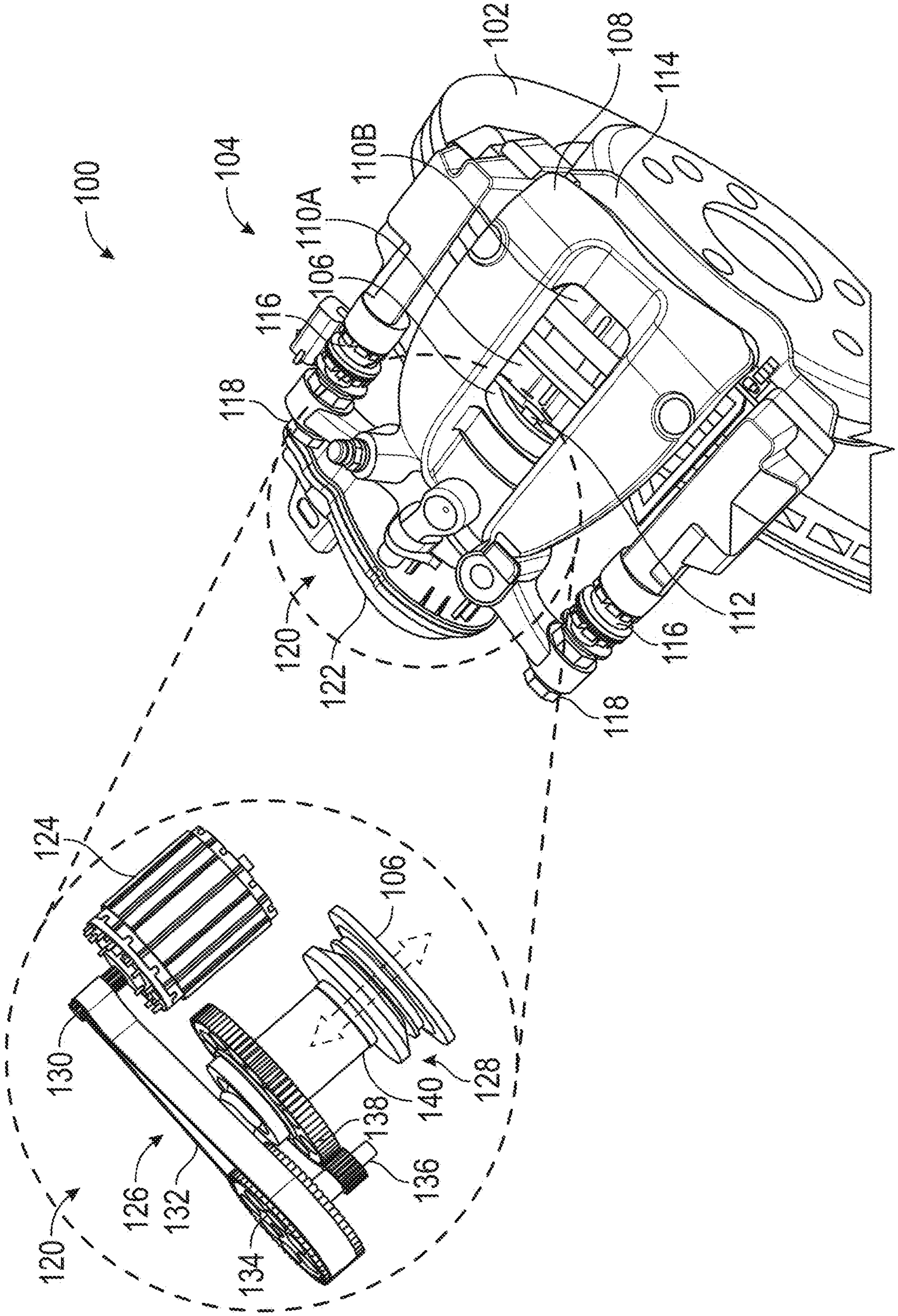
FIG. 2 is a perspective-view illustration of a representative electromechanical brake (EMB) unit with which aspects of this disclosure may be practiced.

Presented in FIG. 2 is a non-limiting example of an electromechanical brake (EMB) disc brake unit 100 for a BBW vehicle brake system of a motor vehicle, such as automobile 10 of FIG. 1. The EMB disc brake unit 100 of FIG. 2 is generally composed of a disc-shaped brake rotor 102, which mounts, e.g., via threaded studs and mating lug nuts, to a spindle hub of a wheel corner assembly (not shown), and a floating brake caliper assembly 104, which mounts, e.g., via threaded bolts, onto a steering knuckle of the corner assembly. A tire-and-wheel unit (not shown) is secured onto the spindle hub of the corner assembly with a circular arrangement of lug nuts so that the tire, wheel, hub, and rotor 102 all rotate in unison with one another. The brake caliper assembly 104 includes a rigid and protective caliper housing 108 that straddles the brake rotor 102 (representative of a "rotating brake element") and carries a brake piston 106 for operative engagement with a pair of inboard and outboard brake pads 110A and 110B, respectively (representative of a "friction brake element"). The caliper housing 108 movably mounts onto a caliper mounting bracket 114 via locking pins 116 and mating hex-head bolts 118 such that the caliper assembly 104 "floats" on the rotor 102. While portrayed herein as a single-piston, floating-caliper disc brake design, it is envisioned that the EMB unit 100 may take on any suitable friction brake configuration, including multiple-piston configurations, opposed-piston caliper designs, drum brake systems, etc.

During operation of the EMB unit 100, the brake piston 106 reciprocally translates (e.g., diagonally right and left in FIG. 2) within the caliper housing 108 to apply compressive forces to the opposing brake pads 110A and 110B. For floating-type caliper designs, brake piston 106 first pushes against a brake pad shim 112 abutting a backplate of the inner brake pad 110A until the pad 110A presses into an inner face of the brake rotor 102. The continuous building of pressure applied to and through the now-stationary piston 106 forces the caliper housing 108 to slide on the mounting bracket 114 (e.g., in a leftward direction in FIG. 2). Doing so causes the caliper housing 108 to pull the outer brake pad 110B against an outer face of the brake rotor 102 such that the rotor 102 is now frictionally engaged with and pinched between both the inner and outer brake pads 110A, 110B. Activation of the brake piston 106 in this manner frictionally engages the friction material of the two brake pads 110A, 110B against opposing sides of the rotor 102 during a braking event. This frictional engagement turns kinetic energy of the vehicle wheel unit into heat energy of the EMB unit 100 that, in turn, slows/stops rotation of the rotor and wheel.

Mounted onto an inboard end of the caliper housing 108 is a motor-driven ball-screw actuator (BSA) assembly 120 that is operable to selectively effect activation and deactivation of the EMB unit's brake piston 106. The BSA assembly 120 of FIG. 2 employs a rigid and protective BSA outer housing 122 that contains therein an electric servo motor 124, a belt-drive transmission 126, and a ball-screw actuator 128. Powering of the electric servo motor 124 (representative of a "brake motor") may be governed by a brake system electronic control unit (ECU), such as BSCM 56 of FIG. 1, to transmit torque from a motor-shaft mounted drive sheeve 130, through a toothed drive belt 132, to a driven belt sheave 134 of the belt-drive transmission 126. Rotational forces are transferred from the belt sheave 134, through a toothed drive shaft 136, to a complementary spur-type reduction gear 138 of the ball-screw actuator 128 (representative of a "brake actuator"). Rotation of the reduction gear 138 effects rectilinear translation of a screw shaft 140 (e.g., from left-to-right in FIG. 2) such that a terminal end of the screw shaft 140 presses against and translates the brake piston 106. Disengagement of the shaft 140 and piston 106 may be effected by reversing the rotational output of the servo motor 124.

When operating a friction brake system, such as a BBW EMB vehicle brake system, the brake hardware may experience a "brake drag" condition in which the brake pads fail to fully disengage from the brake rotor after the brake pedal is released or a deceleration torque request is otherwise discontinued. One key factor that affects the extent and duration of a brake drag event is the part-to-part gap—or "running clearance"—between the brake pad and the brake rotor when the brakes are not applied. For instance, a large running clearance tends to reduce brake drag but may also lead to a higher system response time. On the other hand, a small running clearance may reduce system response time but may also lead to increased brake drag. Therefore, when deriving the system-calibrated settings, the default running clearance may be set to an optimized value that minimizes brake drag while limiting any attendant increase to system response time. Discussed below are closed-loop feedback control systems and methods for mitigating brake drag of BBW friction brake systems by dynamically adapting running clearance to optimized RC values each tailored to a specific operating state of the subject "host" vehicle. Active brake drag control may be achieved through precision piston extension and retraction movement using EMB motor control.

As the host vehicle travels in a forward direction, a resident BSCM/ECU may systematically monitor a real-time accelerator pedal position; if the pedal is depressed, the BSCM/ECU can infer that the driver does not wish to apply the vehicle brakes (i.e., "no brake intention"). In this case, the brake piston may be moved away from the brake rotor to increase running clearance and reduce brake drag. Likewise, the BSCM/ECU may monitor for an acceleration request during Adaptive Cruise Control (ACC); if one is requested, the piston may be moved backwards to secure sufficient running clearance and reduce brake drag. Once the acceleration request is discontinued—be it by the driver or ADAS—the piston may be returned to its optimized default position to maintain a stable running clearance that does not negatively affect the brake system's response time. Upon detection of a forward impact alert or other ADAS warning event that triggers an AEB situation, the piston may be moved towards the brake rotor to reduce RC and ensure a faster reaction time, e.g., thereby reducing the AEB braking distance and improving AEB braking performance. Real-time vehicle speed and vehicle cornering may also be actively monitored by the BSCM/ECU; if the host vehicle is travelling at a relatively low speed or turning a corner, RC may be increased to ensure no brake drag will occur at those times.

Attendant benefits for at least some of the disclosed concepts include smart vehicle braking systems and control logic that provision improved brake drag mitigation without affecting brake system response time by actively and automatically adjusting running clearance for select driving conditions. Instead of using conventional hydraulic pressure, which may not enable precise piston positioning, the vehicle's BSCM/ECU may dynamically respond to changing vehicle operating conditions by selectively varying the running clearance between the brake pads and rotors by pushing or pulling each caliper piston with a bidirectional electric motor that is integrated into each EMB caliper assembly. The brake system ECU may actively vary running clearance depending on driver and ADAS feedback through communication with a TBW accelerator pedal, a SBW steering wheel, or an ACP/ACC/BSD/AEB module. It is envisioned that RC may be synchronously varied for all of the EMB units in a coordinated manner or, if desired, may be varied for only one or some of the EMB units.

Pad-to-rotor running clearance may be actively adapted to any one of multiple predefined RC values each associated with a corresponding set of vehicle operating conditions. In accord with a non-limiting example, brake drag performance may be optimized by actively adapting RC according to vehicle operating conditions as follows:

(1) Normal: default running clearance that balances brake drag and brake system response time (e.g., $RC_{def}$=about 0.3 millimeters (mm));
(2) Level 1: small increase to running clearance to obtain better drag performance during acceleration (e.g., Backward Calibration #1: $RC_{L1}$=about 0.4 mm);
(3) Level 2: medium increase to running clearance to improve drag performance during a cornering driving maneuver that increases lateral force (e.g., Backward Calibration #2: $RC_{L2}$=about 0.45 mm);
(4) Level 3: large increase to running clearance to obtain better drag performance at low vehicle speeds (e.g., Backward Calibration #3: $RC_{L3}$=about 0.5 mm); and
(5) Level 0: reduced running clearance compared to Normal setting to provide better system response time (e.g., Forward Calibration #1: $RC_{F}1$=about 0.2 mm).

In general, the running clearances may be fixed, in order from smallest to largest (Level 0<Normal<Level 1<Level 2<Level 3), and may be calibrated according to predefined vehicle characteristics. It should be appreciated that the vehicle brake system may employ greater or fewer than the foregoing five preset running clearances (e.g., additional reduced RC values may be added for various predicted braking events). Moreover, the specific RC values presented above are provided purely for purposes of explanation and are therefore non-limiting in nature. Rather than selecting from a fixed set of predefined RC values, it is also envisioned that the BBW vehicle brake system's running clearance may be continuously varied within a preset RC range.

Automated running clearance adjustments may be made through precise piston retraction control of the individual EMB brake units during regular vehicle operation. The brake system may predict that the driver does not have an immediate braking intent by monitoring accelerator pedal use. For instance, the brake system BSCM/ECU may communicate with the ECM, which tracks accelerator pedal position; upon confirming that the accelerator is depressed, the system may command an increase in running clearance between the brake pads and brake rotor (e.g., Level 1). The vehicle brake system may concurrently determine that there is no ACC braking intent from acceleration request signals output by the ACC system. For instance, the brake system BSCM/ECU may communicate with an ACP module, which controls ACC, and may command an increase to the pad-to-rotor running clearance upon confirming that ACC is maintaining or increasing vehicle speed and, thus, is not presently soliciting activation of the brake system.

Running clearance may be further increased during vehicle acceleration and vehicle cornering maneuvers to provide additional improvements to brake drag performance. The brake system BSCM/ECU may communicate with the Electric Power Steering (EPS) module, which is responsible for monitoring vehicle dynamics status, to detect the onset of a vehicle turning maneuver in which higher brake drag is expected due to deflection of the brake rotors due to lateral forces. The brake system may respond by setting a larger RC to improve drag performance (e.g., Level 2) until the vehicle completes the turn; at that point, RC may be reset to its default value (e.g., Normal). The system may set a largest running clearance during driving at low speeds. The system may secure a smaller running clearance when the vehicle is driving in reverse, is operating in low-visibility or low-mu driving conditions, or is driving in traffic. Reduced running clearances may be implemented for various ADAS warning event conditions, such as lane departure, cross traffic, blind spot alert, etc., to optimize response time and reduce braking distance.

Figure 3:
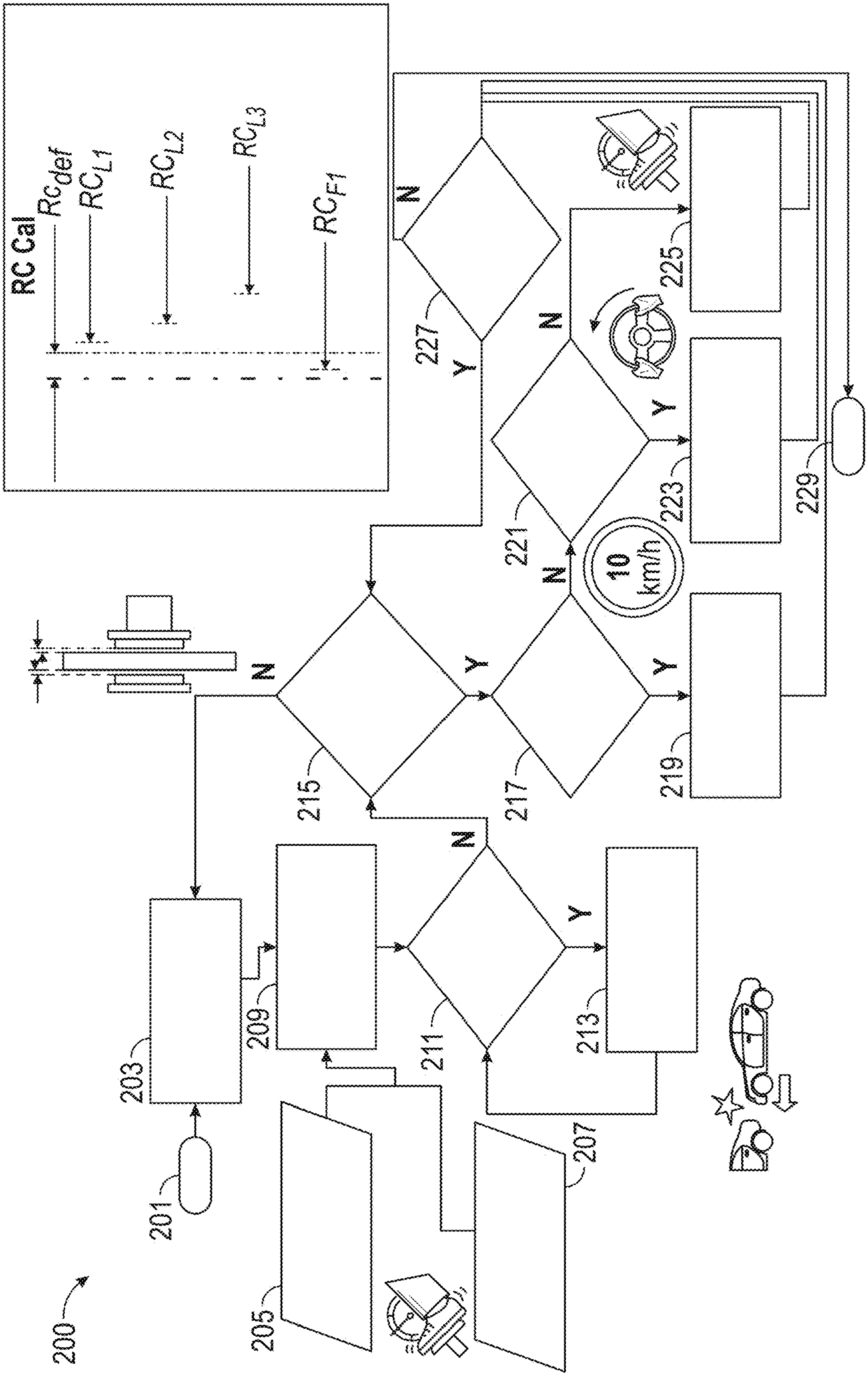
FIG. 3 is a flowchart illustrating a representative brake system control protocol for actively mitigating brake drag of a BBW vehicle brake system, which may correspond to non-transient, memory-stored instructions that are executable by a resident or remote processor, control module, programmable logic device, central controller, or other integrated circuit (IC) device or network of processors/controllers/modules/devices/etc. in accordance with aspects of the present disclosure.

With reference next to the flowchart of FIG. 3, an improved method or control protocol for actively controlling brake drag of a friction brake system, such as a BBW brake system with EMB disc brake units 100 of FIG. 2, for a motor vehicle, such as automobile 10 of FIG. 1, is generally described at 200 in accordance with aspects of the present disclosure. Some or all of the operations illustrated in FIG. 3 and described in detail below may be representative of an algorithm that corresponds to non-transitory, processor-executable instructions that may be stored, for example, in main or auxiliary or remote memory (e.g., resident vehicle memory 38 and/or remote cloud host service 24 database of FIG. 1). These instructions may be executed, for example, by a resident or remote microprocessor, central controller, dedicated control module, programmable logic device, or other module or device or network of processors/controllers/modules/devices (e.g., vehicle CPU 36 and/or cloud host service 24 server-class computer terminal of FIG. 1) to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 may begin at START terminal block 201 of FIG. 3 with memory-stored, computer-readable instructions for initializing a running clearance optimization protocol for a friction braked system. This routine may be initialized in real-time, near real-time, continuously, systematically, sporadically, and/or at predefined time intervals, for example, each 10 or 100 milliseconds during operation of the motor vehicle 10. As yet another option, terminal block 201 may initialize responsive to a user command prompt (e.g., via telematics input controls 28, 32), a resident vehicle controller prompt (e.g., from CPU 36), or a broadcast prompt signal received from a centralized BO vehicle services system (e.g., from cloud host service 24). By way of non-limiting example, method 200 may automatically initialize during a key-on event in which a driver, owner, occupant, or other authorized operator of the vehicle 10 (collectively "user") powers on the vehicle powertrain, e.g., by depressing an ignition start button, or places the vehicle into drive (D) mode, e.g., by shifting a PRNDL shift knob inside passenger cabin 11. Upon completion of some or all of the control operations presented in FIG. 3, method 200 may advance to END terminal block 229 and temporarily terminate or, optionally, may loop back to terminal block 201 and run in a continuous loop. Terminal block 229 may automatically trigger in response to a key-off event in which a user powers off the host vehicle or in response to a user shifting the powertrain into a neutral or park mode.

From terminal block 201, method 200 may advance to DEFAULT RC preparation block 203 and set the host vehicle's friction brake system to a default caliper position. By way of example, and not limitation, resident vehicle BSCM 56 may respond to a key-on event and/or a vehicle shift into drive mode by accessing the resident memory device 38 to retrieve therefrom a Normal RC value. BSCM 56 may concomitantly broadcast a command signal to each of the EMB servo motors 124 to drive the ball-screw actuator 128 in order to shift the screw shaft 140 and set the brake piston 106 at the Normal RC position. It is envisioned that the BBW vehicle brake system may have previously set the brake pistons 106 at the Normal RC position (e.g., when the host vehicle was shifted into park (P) mode); in this instance, preparation block 203 may be optional or, if desired, may be altogether omitted from method 200.

At this juncture, method 200 may begin monitoring operator input and ADAS feedback to track torque request commands from the driver and vehicle. For instance, DRIVER TORQUE REQUEST data input block 205 may include aggregating DTR data indicative of real-time torque commands from the driver, whereas VEHICLE TORQUE REQUEST data input block 207 may include aggregating ADAS data indicative of real-time torque commands and driving alerts from the ADAS system. As noted above, DTR data may be generated by one or more driver input devices, including an accelerator pedal position sensor, a resident ECM, steering wheel-mounted cruise control buttons, wheel speed sensors, etc. In the same vein, ADAS data may be generated by one or more vehicle control modules, such as the ACP, ACC, BSD, and AEB modules, and by one or more sensing devices of an on-vehicle sensor array, such as a forward vehicle camera, a forward long-range radar sensor, a forward mid-range lidar sensor, etc. The collected data may be filtered, preprocessed, fused, stored, and analyzed to derive operator and vehicle intent at DRIVER/ADAS subroutine 209 of FIG. 3.

While tracking driver and vehicle inputs, method 200 may execute ADAS WARNING decision block 211 to determine whether or not an ADAS warning event has been detected by the host vehicle. For instance, the brake system BSCM/ECU may communicate with the ADAS module 54 and SSIM 60 to determine whether or not a forward impact event has been detected and a corresponding forward impact alert was output to the driver (e.g., via telematics unit 14 of FIG. 1). If an ADAS warning event is detected (Block 211=YES), method 200 may responsively execute RC FORWARD (L0)

process block 213 and command each brake motor 124 to drive the brake actuator 120 and piston 106 to thereby reduce the running clearance between the brake pad(s) 110A, 110B and brake rotor 102 to a reduced RC distance (e.g., Forward Calibration #1: $RC_{F1}$). Doing so will help to reduce system response time in case the vehicle driver needs to react to the detected ADAS event. After detecting an ADAS warning event, the vehicle's BSCM/ECU may evaluate new ADAS data to determine whether or not the ADAS warning event is no longer detected; upon verifying that the ADAS warning event is no longer detected, the BSCM/ECU may responsively command the BBW system's brake motors to reposition the brake pistons and pads to reset the running clearance to the default (Normal) RC.

With continuing reference to FIG. 3, method 200 may respond to not detecting or no longer detecting an ADAS warning event (Block 211=NO) by executing ACCEL REQUEST decision block 215 to determine whether or not an acceleration request was received from either the driver or the ADAS system to speed up the host vehicle. Absence of an acceleration torque request may imply that the driver or vehicle may be preparing to activate the vehicle brake system and, as such, running clearance should not be increased at that time. Consequently, if an acceleration torque request is not detected (Block 215=NO), method 200 may responsively loop back to process block 203 and either reset the host vehicle's friction brake system to the default (Normal) caliper position (e.g., if RC previously changed) or maintain the brake system at the default position (e.g., if RC previously unchanged). For at least some applications, decision block 215 may return a positive (YES) result if any pressure is being applied to the accelerator pedal that results in a measurable amount of pedal travel irrespective of whether or not the driver is requesting to accelerate the host vehicle (e.g., driver maintaining current vehicle speed).

Upon confirming that driver/vehicle is presently requesting vehicle acceleration and therefore not expected to activate the vehicle brake system (Block 215=YES), method 200 may responsively execute LOW SPEED decision block 217 to determine whether or not the real-time speed of the host vehicle is less than a predefined speed threshold (e.g., 10 kph). If the host vehicle is presently operating at low vehicle speeds (Block 217=YES), method 200 may responsively execute RC BACKWARD (L3) process block 219 and command each BBW brake motor 124 to retract the brake actuator 120 and piston 106 and thereby enlarge the running clearance to a large (third) increased RC distance (e.g., Backward Calibration #3: $RC_{L3}$). While not per se required, the brake system BSCM/ECU may corroborate a lack of a brake torque request by confirming the brake pedal is not presently being depressed by the driver.

Method 200 of FIG. 3 may conclude that the real-time vehicle speed exceeds the predefined speed threshold and, thus, the host vehicle is not operating at low vehicle speeds (Block 217=NO). In this case, method 200 may respond by executing VEHICLE CORNERING decision block 221 to determine whether or not the host vehicle is presently executing a cornering maneuver. Returning again to the example of FIG. 1, vehicle BSCM 56 may communicate through SSIM 60 with the vehicle dynamics sensors 68 (e.g., inertial measurement unit (IMU) with six-axis accelerometer and integrated gyroscope) to retrieve therefrom real-time vehicle lateral acceleration (VLA) data for the host vehicle. In this instance, the vehicle BSCM 56 may filter, preprocess, store, and evaluate the VLA sensor data to determine whether or not a real-time lateral acceleration of the host vehicle exceeds a predefined VLA threshold (e.g., approximately 0.2 g's). To corroborate that the host vehicle is in fact executing a cornering maneuver, rather than merely modifying the vehicle's steer-ahead angle, BSCM 56 may communicate with a resident SCM to retrieve therefrom steering wheel angle (SWA) sensor data from the angle sensor of an SBW steering wheel. Once received, the BSCM 56 may evaluate the SWA data to confirm that a real-time SWA of the host vehicle's steering wheel is greater than a predefined SWA threshold (e.g., about 235 degrees (°)). If the host vehicle is executing a cornering maneuver (Block 221=YES), method 200 may responsively execute RC BACKWARD (L2) process block 223 and command one or more of the BBW brake motor 124 to retract the brake actuator 120 and piston 106 and thereby enlarge the running clearance to a medium (second) increased RC distance (e.g., Backward Calibration #2: $RC_{L2}$).

After verifying that the host vehicle is not executing a cornering maneuver (Block 221=NO), method 200 of FIG. 2 may responsively execute RC BACKWARD (L1) process block 225 and command some or all of the BBW brake motors 124 to retract the brake actuator 120 and piston 106 and thereby enlarge the running clearance to a small (first) increased RC distance (e.g., Backward Calibration #1: $RC_{L1}$). After completing any of the running clearance calibrations at process blocks 219, 223 and 225, method 200 may proceed to LOOP EXIT decision block 227 and determine whether or not the vehicle is still traveling in a forward direction. If the vehicle has come to a stop and shifted into a park (P) mode or has been turned off (Block 227=NO), method 200 may responsively loop to END terminal block 229 and temporarily terminate. On the other hand, if the host vehicle is still in drive (D) mode and being driven in a forward direction (Block 227=YES), method 200 may responsively loop back to decision block 215 to determine whether or not the driver or the ADAS system has input an acceleration torque request for the host vehicle.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle with a brake-by-wire (BBW) brake system, the BBW brake system including a brake motor configured to drive a brake actuator to thereby press a friction brake element against a rotating brake element, the method comprising:

receiving, via a vehicle controller, vehicle dynamics data indicating the motor vehicle is traveling in a forward direction;

receiving, via the vehicle controller responsive to the motor vehicle traveling in the forward direction, advanced driver assistance system (ADAS) data and driving torque request (DTR) data for the motor vehicle;

determining, via the vehicle controller, if the ADAS data indicates an ADAS warning event is detected and if the DTR data indicates an acceleration torque request was received to accelerate the motor vehicle; and commanding the brake motor to drive the brake actuator and thereby change a running clearance (RC) between the friction brake element and the rotating brake element to a reduced RC distance in response to detection of the ADAS warning event or to a first increased RC distance in response to receiving the acceleration torque request to accelerate the motor vehicle.

2. The method of claim 1, further comprising:

determining, via the vehicle controller, the ADAS data indicates the ADAS warning event is not detected and the DTR data indicates the acceleration torque request was received to accelerate the motor vehicle; and receiving, via the vehicle controller responsive to not detecting the ADAS warning event and receiving the acceleration torque request, vehicle lateral acceleration (VLA) sensor data from a multi-axis accelerometer of the motor vehicle.

3. The method of claim 2, further comprising:

determining, via the vehicle controller, if the VLA sensor data indicates a current VLA of the motor vehicle exceeds a predefined VLA threshold; and commanding the brake motor to drive the brake actuator and thereby change the running clearance to a second increased RC distance, greater than the first increased RC distance, in response to the current VLA exceeding the predefined VLA threshold.

4. The method of claim 3, further comprising:

determining, via the vehicle controller, the VLA sensor data indicates the current VLA of the motor vehicle is less than the predefined VLA threshold and the DTR data indicates a current vehicle speed of the motor vehicle is less than a predefined speed threshold; and commanding the brake motor to drive the brake actuator and thereby change the running clearance to a third increased RC distance, greater than the first and second increased RC distances, in response to the current VLA being less than the predefined VLA threshold and the current vehicle speed being less than the predefined speed threshold.

5. The method of claim 4, further comprising:

receiving, via the vehicle controller, steering wheel angle (SWA) sensor data from an angle sensor of a steering wheel of the motor vehicle; and determining, via the vehicle controller, the SWA sensor data indicates a current SWA of the steering wheel is less than a predefined SWA threshold, wherein commanding the brake motor to change the running clearance to the third increased RC distance is further in response to the current SWA of the steering wheel being less than the predefined SWA threshold.

6. The method of claim 1, further comprising:

receiving, via the vehicle controller prior to changing the running clearance, vehicle ignition data indicating the motor vehicle was turned on; and commanding the brake motor to drive the brake actuator and thereby set the running clearance to a default RC distance in response to the motor vehicle being turned on.

7. The method of claim 1, further comprising:

determining, via the vehicle controller after changing the RC to the first increased RC distance, if the motor vehicle is still traveling in the forward direction;

determining, via the vehicle controller responsive to determination that the motor vehicle is still traveling in the forward direction, if a new acceleration torque request was received to accelerate the motor vehicle; and commanding the brake motor to drive the brake actuator and thereby set the running clearance to a default RC distance in response to not receiving the new acceleration torque request.

8. The method of claim 1, wherein the acceleration torque request is received from a driver via a driver input device and/or from an ADAS control module of an ADAS system.

9. The method of claim 1, further comprising determining, via the vehicle controller from the ADAS data and the DTR data, a brake request was not received from a driver or an ADAS control module of the motor vehicle, wherein determining if the acceleration torque request was received is in response to not receiving the brake request.

10. The method of claim 1, further comprising:

determining, via the vehicle controller after detection of the ADAS warning event, if the ADAS data indicates the ADAS warning event is no longer detected; and commanding the brake motor to drive the brake actuator and thereby set the running clearance to a default RC distance in response to no longer detecting the ADAS warning event.

11. The method of claim 1, wherein the vehicle dynamics data is received from an engine control module (ECM), a powertrain control module (PCM), a motor control module (MCM), a body control module (BCM), and/or a wheel speed sensor.

12. The method of claim 1, wherein the DTR data is received from an accelerator pedal sensor, and wherein the ADAS data is received from a vehicle sensor array including a forward vehicle camera, a forward long-range radar sensor, and/or a forward mid-range lidar sensor.

13. The method of claim 1, wherein the brake motor is an electric servo motor, the brake actuator is a ball-screw actuator (BSA) assembly that engages a brake piston, the friction brake element is a brake pad, and the rotating brake element is a brake rotor, and wherein the electric servo motor drives the BSA assembly to move the brake piston and thereby change the RC between the brake pad and the brake rotor.

14. A non-transient, computer-readable medium storing instructions executable by a vehicle controller of a motor vehicle with a brake-by-wire (BBW) brake system, the BBW brake system including a brake motor configured to drive a brake actuator to thereby press a friction brake element against a rotating brake element, the instructions, when executed, causing the vehicle controller to perform operations comprising:

receiving vehicle dynamics data indicating the motor vehicle is traveling in a forward direction;

receiving, responsive to the motor vehicle traveling in the forward direction, advanced driver assistance system (ADAS) data and driving torque request (DTR) data;

determining if the ADAS data indicates an ADAS warning event is detected and if the DTR data indicates an acceleration torque request was received to accelerate the motor vehicle; and commanding the brake motor to drive the brake actuator and thereby change a running clearance (RC) between the friction brake element and the rotating brake element to a reduced RC distance in response to detection of the ADAS warning event or to a first increased RC distance in response to receiving the acceleration torque request to accelerate the motor vehicle.

15. A motor vehicle, comprising:

a vehicle body;

a plurality of road wheels attached to the vehicle body;

a prime mover attached to the vehicle body and configured to drive at least one of the road wheels to thereby propel the motor vehicle;

a brake-by-wire (BBW) brake system attached to the vehicle body and including multiple electromechanical brake (EMB) units each configured to slow a respective one of the road wheels, each of the EMB units including an electric servo motor configured to drive a ball-screw actuator (BSA) assembly and thereby push a brake piston into a brake pad such that the brake pad presses against a brake rotor mounted to rotate in unison with the respective one of the road wheels; and a vehicle controller programmed to:

receive vehicle dynamics data indicating the motor vehicle is traveling in a forward direction;

responsive to the motor vehicle traveling in the forward direction, receive advanced driver assistance system (ADAS) sensor data from a vehicle sensor array and driving torque request (DTR) data from a driver input device;

determine if the ADAS sensor data indicates an ADAS warning event is detected and if the DTR data indicates an acceleration torque request was received to accelerate the motor vehicle; and command the electric servo motor to drive the BSA assembly and thereby change a running clearance (RC) between the brake pad and the brake rotor to a reduced RC distance in response to detection of the ADAS warning event or to a first increased RC distance in response to receiving the acceleration torque request to accelerate the motor vehicle.

16. The motor vehicle of claim 15, wherein the vehicle controller is further programmed to:

determine the ADAS sensor data indicates the ADAS warning event is not detected and the DTR data indicates the acceleration torque request was received to accelerate the motor vehicle; and responsive to not detecting the ADAS warning event and receiving the acceleration torque request, receive vehicle lateral acceleration (VLA) sensor data from a multi-axis accelerometer of the motor vehicle.

17. The motor vehicle of claim 16, wherein the vehicle controller is further programmed to:

determine if the VLA sensor data indicates a current VLA of the motor vehicle exceeds a predefined VLA threshold; and command the electric servo motor to drive the BSA assembly and thereby change the running clearance to a second increased RC distance, greater than the first increased RC distance, in response to the current VLA exceeding the predefined VLA threshold.

18. The motor vehicle of claim 17, wherein the vehicle controller is further programmed to:

determine the VLA sensor data indicates the current VLA of the motor vehicle is less than the predefined VLA threshold and the DTR data indicates a current vehicle speed of the motor vehicle is less than a predefined speed threshold; and command the electric servo motor to drive the BSA assembly and thereby change the running clearance to a third increased RC distance, greater than the first and second increased RC distances, in response to the current VLA being less than the predefined VLA threshold and the current vehicle speed being less than the predefined speed threshold.

19. The motor vehicle of claim 18, wherein the vehicle controller is further programmed to:

receive steering wheel angle (SWA) sensor data from an angle sensor of a steering wheel of the motor vehicle; and determine the SWA sensor data indicates a current SWA of the steering wheel is less than a predefined SWA threshold, wherein commanding the servo motor to change the running clearance to the third increased RC distance is further in response to the current SWA of the steering wheel being less than the predefined SWA threshold.

20. The motor vehicle of claim 15, wherein the vehicle controller is further programmed to determine, from the ADAS sensor data and the DTR data, a brake request was not received from a driver or an ADAS control module of the motor vehicle, wherein determining if the acceleration torque request was received is in response to not receiving the brake request.

* * * * *